(12) United States Patent
Song

(10) Patent No.: US 11,292,538 B2
(45) Date of Patent: Apr. 5, 2022

(54) SYSTEM FOR AUTOMATICALLY CORRECTING BICYCLE HANDLEBAR AND WAREHOUSING BICYCLE

(71) Applicant: Yajun Liu, Guangdong (CN)

(72) Inventor: Yunbo Song, Guangdong (CN)

(73) Assignee: Yajun Liu, Shenzhen (CN)

( * ) Notice: Subject to any disclaimer, the term of this patent is extended or adjusted under 35 U.S.C. 154(b) by 0 days.

(21) Appl. No.: 16/886,745

(22) Filed: May 28, 2020

(65) Prior Publication Data

US 2020/0290693 A1  Sep. 17, 2020

Related U.S. Application Data

(63) Continuation of application No. PCT/CN2018/118231, filed on Nov. 29, 2018.

(30) Foreign Application Priority Data

Dec. 21, 2017 (CN) .......................... 201721803817.8
May 4, 2018 (CN) .......................... 201820658632.0

(51) Int. Cl.
*B62H 3/02* (2006.01)
*E04H 6/00* (2006.01)

(52) U.S. Cl.
CPC .............. *B62H 3/02* (2013.01); *E04H 6/005* (2013.01)

(58) Field of Classification Search
CPC .. B62H 5/02; B62H 3/02; B62K 21/10; E04H 6/005
See application file for complete search history.

(56) References Cited

U.S. PATENT DOCUMENTS

2015/0360739 A1* 12/2015 Ashlag .................. B62H 5/005
29/426.2

FOREIGN PATENT DOCUMENTS

| CN | 2825411 Y | 10/2006 |
|---|---|---|
| CN | 204920326 U | 12/2015 |
| CN | 106875582 A * | 6/2017 |
| CN | 206581654 U | 10/2017 |
| JP | 2014145242 A | 8/2014 |

* cited by examiner

*Primary Examiner* — Kaitlin S Joerger

(57) ABSTRACT

A system for automatically correcting bicycle handlebar and warehousing the bicycle includes a bicycle and a warehouse box for storing the bicycle. The bicycle includes a bicycle frame, a handlebar, a stem, a front wheel and a rear wheel; an encoder is mounted on a bicycle frame for recording a rotation angle of a stem and sensing whether the handlebar is corrected. A rear-wheel correcting and fine-adjusting device is provided in the warehousing box or on the bicycle frame. The rear-wheel correcting and fine-adjusting device automatically twists a rear wheel according to a deviation angle record of the encoder on the bicycle frame so that the rear wheel and a front wheel form a plane. The system is capable of automatically correcting the handlebar and warehousing the bicycle, thereby facilitating the automatic storage and greatly reducing the storage space in the warehousing box.

7 Claims, 4 Drawing Sheets

SYSTEM FOR AUTOMATICALLY CORRECTING BICYCLE HANDLEBAR AND WAREHOUSING BICYCLE

CROSS-REFERENCE TO RELATED APPLICATIONS

This application is a continuation of International Application No. PCT/CN2018/118231 with a filing date of Nov. 29, 2018, designating the United states, now, and further claims to the benefit of priority from Chinese Application No. 201721803817.8 with a filing date of Dec. 21, 2017 and Chinese Application No. 201820658632.0 with a filing date of May 4, 2018. The content of the aforementioned applications, including any intervening amendments thereto, are incorporated herein by reference.

TECHNICAL FIELD

The present application relates to mechatronics, and more specifically to a system for automatically correcting a handlebar of a bicycle and warehousing the bicycle (it may also refer to other similar vehicles). The bicycle using such system automatically adjusts the front wheel and the rear wheel of the bicycle to keep the front wheel and rear wheels in alignment so that the bicycle can automatically go into and out of a warehousing box conveniently, thus improving the storage efficiency.

BACKGROUND

Bicycle sharing becomes more and more popular nowadays, which facilitates people's life. However, there are many obvious disadvantages, for example, bicycles are misplaced and occupy too much public place, which severely affects the appearance of a city. A disclosure titled "Self-service sharing method for blade type automatic deformation bicycle" made by the present inventor provides a method that enables a bicycle to automatically deform. Using this method, bicycles are uniformly compressed and stored in warehousing boxes, which eliminates the above-mentioned disadvantages of sharing bicycles.

SUMMARY

Technical Problem

After the retraction and deformation, it is essential to align the front wheel with the rear wheel before the bicycle is warehoused. First, the alignment of the front and rear wheels (i.e., the correction of the bicycle handlebar) can keep the bicycle in a blade shape and minimize the occupied space. Second, the alignment of the front and rear wheels will not change the wheels' direction when getting into and out of a warehousing box, thereby improving the storage efficiency.

Technical Solutions

The technical solutions for the technical problem of the present disclosure are described as follows. The bicycle includes a bicycle frame, a handlebar, a stem, a front wheel and a rear wheel. The bicycle automatically enters the specified warehousing box after the handlebar of the bicycle is corrected. Specifically, a chargeable battery and controller are provided in the bicycle; an encoder is mounted on a frame (bicycle frame) for recording a rotation angle of a stem (i.e., front wheel) and sensing whether the handlebar is corrected (other similar methods can be used). The frame is also provided with a locating device. When the stem and the handlebar of the bicycle are corrected (i.e., the front wheel aligns with the rear wheel), an electric actuator, such as electromagnets and electric motors, drives the locating device to lock the front wheel, so that the front wheel stably aligns with the rear wheel for convenient storage and discharge of the bicycle in the warehousing box. A conveying device, which may be an electric conveying device, is provided in the warehousing box and is configured to drive the bicycle to automatically go into or out of the warehousing box after the handlebar of the bicycle is corrected. Specifically, the light in the area with a vacancy in the warehousing box turns green; the user first aligns the front wheel and the guide slot of this vacancy in the warehousing box, and pushes the bicycle into the warehousing box; the front wheel triggers the switch in the warehousing box, and the user is reminded to correct the rear wheel; after the user lifts the rear wheel to approximately align with the front wheel, the encoder senses the general alignment of the front and rear wheels, and then the conveying device in the warehousing box automatically conveys the bicycle into the warehousing box. The handlebar may be not absolutely corrected when the wheel is placed by the user, so a rear-wheel correcting and fine-adjusting device is mounted in the warehousing box or the bicycle frame and automatically twists the rear wheel according to a deviation angle record (this record can be transmitted to the controller of the warehousing box through a wire or wireless mode) of the encoder on the bicycle frame, so that the rear wheel aligns with the front wheel, that is, these handlebars of the bicycle which are not corrected are finely adjusted during the conveying of the bicycles, and then are locked for convenient delivery and storage of the bicycle.

The implementation principle of the present disclosure is described as follows: a chargeable battery is installed in the bicycle. The bicycle handle is fixed on the stem, which is usually referred to as the handlebar. The stem rotates in a pipe called head pipe in front of the bicycle frame, and then drives the front wheel to rotate through the front fork, thereby achieving the change of travelling directions during cycling. Since the handlebar of a regular bicycle is flexible, the handlebar needs to be manually twisted to change the travelling directions during cycling, and the handlebar at rest normally bends and achieves static balance through a support. In the present disclosure, the bicycle needs to be automatically retracted into a blade shape and be parked in the specified warehousing box with the front wheel aligning with the rear wheel. However, without assisting systems, it is extremely hard to meet the above requirements all the time with the visual judgment and manual operation. Therefore, an assisting system is needed to help the users to automatically correct the handlebar and warehouse the bicycle.

First, a sensor is needed to sense whether the handlebar is corrected and determine the exact deviation angle. Specifically, the sensor is the encoder mounted on the frame for recording a rotation angle of the stem (i.e., front wheel) and sensing whether the handlebar is corrected. The rotation angle of the stem indicates the position of the front wheel, and the meshing of a gear mounted on the stem synchronizes the rotation of the stem to the rotation of the encoder shaft (it's not convenient to directly mount an encoder on the stem). When the stem rotates, the microcontroller on the bicycle frame records the number and direction of encoder pulses through the phase A and phase B interrupt signals of the encoder. Initially, the front wheel aligns with the rear wheel, and a deviation from the corrected position of the front and rear wheels will trigger the encoder to generate pulses, in which the number of pulses reflects the magnitude of the deviation angle.

A conveying device, which may be an electric conveying device, is provided in the warehousing box, and is capable of automatically conveying the retracted and deformed bicycle into or out of the warehousing box after the handlebar is corrected. When entering the warehousing box, the bicycle is not required to be completely retracted into a plane, that is, the handlebar is not needed to be corrected. Therefore, the bicycle is warehoused with simple operations, and operation errors are eliminated. The specific steps are as follows: the light in the corresponding area with the vacancy in the warehousing box turns green; the user first aligns the front wheel and the guide slot of this vacancy in the warehousing box, and pushes the bicycle into the warehousing box. The reason for using the front wheel to enter the warehousing box first is that the front wheel is relatively flexible, and forward and backward operations and alignment actions are easy to be realized by the front wheel. After aligning the front wheel with the guide slot, the user pushes the front wheel into the warehousing box, and the front wheel triggers the switch in the warehousing box, and the triggered warehousing box switch reminds the user to correct the rear wheel (it may use voice or different lighting as the reminder, for example, both a red light and a green light are on at the same time, or a green light flickers, etc., and the reminder mode is the same hereinafter). After the user lifts the rear wheel to roughly align with the front wheel (because the warehousing box communicates with the microcontroller on the bicycle frame, the warehousing box can obtain the encoder deviation angle to determine whether the bicycle handlebar is roughly corrected), the user is reminded of the completion of the preparation, and then the conveying device in the warehousing box automatically conveys the bicycle into the warehousing box.

Under most circumstances, the user cannot completely correct the rear wheel though manual operation, so the error should be tolerable (the front and rear wheels do not deviate significantly from the plane formed by the front and rear wheels, and the bicycle can be pulled along). In this way, the user can use the bicycle conveniently, and the bicycle is successfully warehoused at one time. Therefore, a rear-wheel correcting and fine-adjusting device is mounted in the warehousing box or the bicycle frame, and automatically twists the rear wheel according to a deviation angle record (this record can be transmitted to the controller of the warehousing box through a wire or wireless mode) of the encoder on the bicycle frame, so that the rear wheel aligns with the front wheel, that is, the handlebar of the bicycle which is not completely corrected is finely adjusted to a corrected position during the conveying process of the bicycle, and then the handlebar is positioned and locked for the convenient conveying and storage of the bicycle. When the rear wheel aligns with the front wheel, the rear wheel will be gradually corrected by pulling or pushing the front wheel forward for a relatively long distance to align with the front wheel. However, the purpose of the present disclosure is to minimize the bicycle storage space, but the above-mentioned method will waste a large amount of storage space (the rear wheel occupies a large amount of left-right space before corrected). Therefore, the rear wheel needs to be completely corrected quickly. The principle of the fine-adjusting correction is to twist or drag the rear wheel to align with the front wheel, and this force for the twisting or dragging is either from the bicycle or the warehousing box. When the force is from the bicycle, due to the relatively large torque of the rear wheel, a large electric motor is generally needed, which will increase the weight of the bicycle. However, it is relatively simple to finely adjust the rear wheel by the warehousing box, and one rear-wheel correcting and fine-adjusting device can be shared by several bicycles. The principle of the fine adjustment for the rear wheel by the warehousing box is described as follows. A slider which can roll on balls is provided at the entrance of each row (or shared by several rows) in the warehousing box, and can be driven by the electric motor to move in the left-right direction. When the bicycle which is not completely corrected enters the warehousing box through the guide slot for the front wheel, the controller in the warehousing box detects that the rear wheel is already on the slider through the haul distance of the front wheel or other ways when the rear wheel just reaches the slider. Then, the deviation angle of the front and rear wheels is obtained from the bicycle microcontroller through a wire (using the front-wheel guide slot as a signal wire) or wireless mode, and the distance for left-right movement of the slider is calculated. When the rear-wheel arc is corrected, the front wheel must move forward to keep the rear wheel from retreating forcibly (the arc radius is longer than the chord height). Therefore, during the correcting, the controller of the warehousing box coordinates the slider while the front wheel is dragged forward. The rear wheel is completely corrected after the front wheel moves forward for only several centimeters. A locating device is also mounted on the bicycle frame. When the stem and the handlebar are completely corrected (i.e. the front wheel aligns with the rear wheel), the electric actuator (such as electromagnets, or electric motors) drives the locating device to lock the front wheel, so that the front wheel stably aligns with the rear wheel to ensure the convenient storage and discharge of the bicycle. After the locating device is started, the bicycle can be conveniently and orderly delivered and stored in the warehousing box. A wedgy front-wheel locating column is drawn from the bicycle head pipe and can be accurately inserted into the guide slot for the front wheel, so the front wheel can be accurately positioned in the warehousing box. After this fine adjustment, the bicycle can be densely stored one by one in the warehousing box. As these bicycles have been automatically retracted into a very compact blade shape by other inventions of the present inventor, a regular parking space is capable of receiving over a hundred retracted and deformed bicycles.

Beneficial Effects of the Invention

The system of the present disclosure can automatically correct the bicycle handlebar and warehouse the bicycle, so that the bicycle can be automatically stored and goes into or out of the warehousing box conveniently. The retracted bicycle with the corrected handlebar can be orderly and automatically stored in specified warehousing box, thereby achieving the good economical effect and use convenience. More importantly, together with other inventions of the present inventor, the present disclosure solves the problem that the sharing bicycle occupies a large amount of space and severely affects the city appearance.

BRIEF DESCRIPTION OF THE DRAWINGS

The present disclosure is further illustrated below with reference to the drawings and embodiments.

Figure 1:
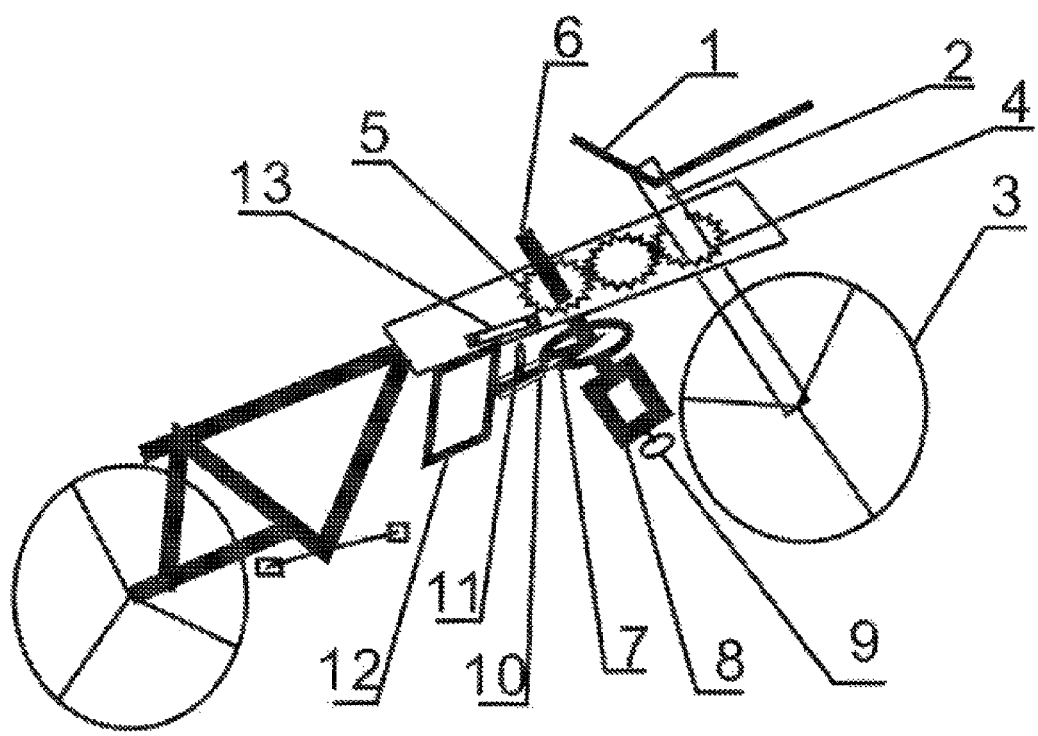
FIG. 1 is a schematic diagram of an overall structure of a bicycle according to the present invention.

In the drawings, 1, handlebar grip; 2, stem; 3, front wheel; 4, stem gear; 5, meshing gear; 6, electric motor shaft; 7, baffle; 8, gear motor; 9, encoder; 10, locating pin; 11, magnetic core; 12, locating motor; 13, Hall effect sensor; 14, warehousing box; 15, retracted blade-shaped bicycle; 16, vacancy in the warehousing box; 17, rear-wheel correcting and fine-adjusting device; 18, slider; 19, ball; 20, rear wheel; 21. fine-adjusting electric motor; 22, guide screw.

PREFERRED EMBODIMENT OF THE INVENTION

Figure 2:
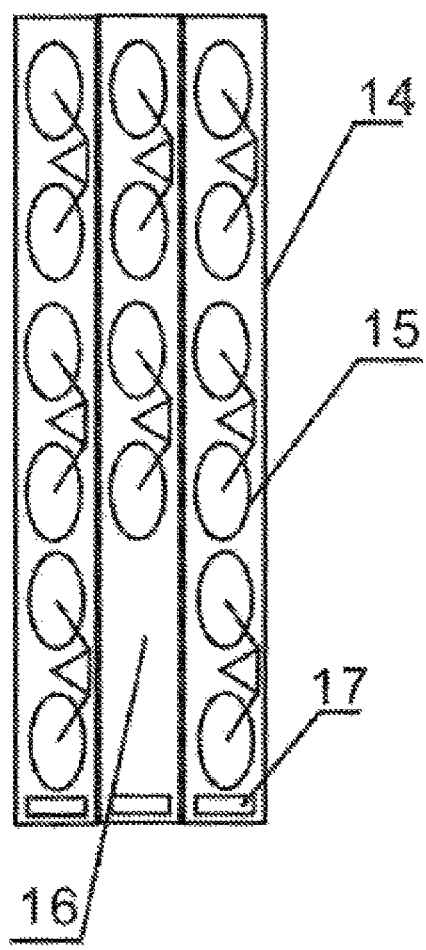
FIG. 2 is a schematic diagram of a specified warehousing box according to the present invention.

In an embodiment shown in FIGS. 1 and 2, a system for automatically correcting a bicycle handlebar is installed on a frame of a retractable bicycle and a warehousing box 14 for the retractable bicycle. A stem gear 4 is mounted on the stem 2 of the bicycle, and a meshing gear 5 meshed with the stem gear 4 is installed on the frame. As the stem gear 4 is fixed on the stem 2 and is not capable of relative displacement, the rotation of the stem gear 4 on the stem 2 can drive the front wheel 3 to rotate, and the meshing gear 5 transmits the rotation of the front wheel 3 to facilitate the convenient installation of the encoder 9. As the bicycle in this embodiment is automatically retracted into a compact blade shape for going into or out of the warehousing box, the front wheel should align with the rear wheel to save more space. Therefore, it is necessary to detect the location of the front wheel 3, that is the deviation angle of the front wheel 3 from a plane formed by the front and rear wheels. An encoder 9 is mounted on the bicycle to record the deviation angle of the stem 2. In this embodiment, a DC gear motor with a rotating magnetic core 11 and a Hall effect sensor 13 is used to realize the encoder function, and the electric motor has a relatively large gear ratio, i.e., when the motor rotates a round, the meshing gear 5 only rotates about one degree. The gear motor 8 uses a DC electric motor with a gear ratio of above 200:1 to increase the locating accuracy of the encoder 9. Therefore, there is a low requirement for the encoder 9 of the electric gear motor 8, so that the cost is low while the accuracy is maintained. The encoder can sense the positive and negative angle deviation of the handlebar from the correction position (even the angle deviation is manually operated), and then the rear-wheel correcting and fine-adjusting device is guided to correct the rear wheel.

In the case that the gear motor 8 is off, when the bicycle handle 1 is manually twisted, as the resistance for reverse rotation is small when the gear motor 8 is idling and the force is exerted on the two ends of the bicycle handle, the arm of force is relatively large, so the rider barely feels the existence of the electric motor when the gear motor 8 is powered off, and the cycling is not affected. A single chip microcontroller is mounted on the frame. When the front wheel 3 rotates in the left-right direction (i.e., a direction perpendicular to a plane of the bicycle), the front wheel 3 drives the stem 2 to rotate; the stem 2 drives the stem gear 4 to rotate; the stem gear 4 drives each meshing gear 5 to rotate; and the meshing gear 5 drives the gear motor 8 to idlingly rotate through the motor shaft 6. The single chip microcontroller records the location of the front wheel (i.e., left deviation or right deviation from the plane formed by the front and rear wheels and the specific magnitude of the deviation) at any time through recording the phase signals such as signals A and B of the encoder 9 on the gear motor 8.

When the bicycle needs to be corrected to enter the warehousing box 14, users are only required to roughly correct the position of the bicycle (i.e., rough adjustment) but not to completely correct the position of the bicycle, so that the front wheel approximately aligns the rear wheel. Since even if the user is required to completely correct the handlebar, users have different interpretations of the criterion of a complete correction, so a complete correction is hard to achieve by the user. Therefore, an assistant impetus is needed to help the user completely correct the handlebar (i.e., fine correction, or correction and fine adjustment). The impetus for the correction and adjustment of the handlebar can come from the bicycle or the warehousing box outside the bicycle. In this embodiment, a front-and-rear-wheel correcting and fine-adjusting device can be mounted on the bicycle frame by increasing the power of the gear motor 8, i.e., increasing the torque of the gear motor. With the front-and-rear-wheel correcting and fine-adjusting device, the twisting of the front wheel 3 is achieved when the rear wheel 20 is fixed, and the twisting of the rear wheel 20 is realized when the front wheel 3 is fixed (when twisting the rear wheel 20, the rear wheel 20 can be placed on a slider 18 to reduce resistance), and the exact angle for the twisting is calculated according to the recorded angle of the encoder. However, considering factors such as cost, bicycle weight and sharing cost, in this embodiment, the rear-wheel correcting and fine-adjusting device 17 is mounted in the warehousing box. As the front wheel 3 is more flexible than the rear wheel 20 and is easy to operate by the user for correction, in this embodiment, the rear-wheel correcting and fine-adjusting device 17 is adopted to adjust the rear wheel 20. The rear-wheel correcting and fine-adjusting device 17 includes a slider 18 capable of rolling on the balls 19; the fine-adjusting electric motor 21 rotates the guide screw 22 to drive the slider 18 to move in the left-right direction. The fine-adjusting electric motor 21 uses a DC gear electric motor with a diameter of 37 mm and with an encoder.

When the user needs to store the bicycle in the warehousing box 14, a light in a row of an area in the warehousing box 14 with a vacancy turns green, and the user first aligns the front wheel 3 and the guide slot of the row of the area with the vacancy 16 in the warehousing box 14; after the front wheel 3 aligns with the guide slot of the front wheel, the user pushes the front wheel 3 into the warehousing box 14 and the switch in the warehousing box 14 is triggered; and then the user is reminded to correct the rear wheel 20 through a voice prompt, and the green light slowly flickers. The user lifts the rear wheel 20 and approximately aligns it with the front wheel 3 and then puts down the rear wheel 20. When the single chip microcontroller on the bicycle receives, through the encoder 9, the signal that the front wheel 3 and the rear wheel 20 are approximately aligned and ready to be warehoused, the single chip microcontroller reminds the user that the preparation is completed and beeps twice. At this time, the user releases the bicycle. After the bicycle automatically retracts the corresponding components using other inventions of the present inventor, the conveying device in the warehousing box 14 delivers the bicycle into the warehousing box 14. If the front and rear wheels deviate greatly from the plane formed by the front and rear wheels, the user will be notified to correct the rear wheel 20 again.

Figure 3:
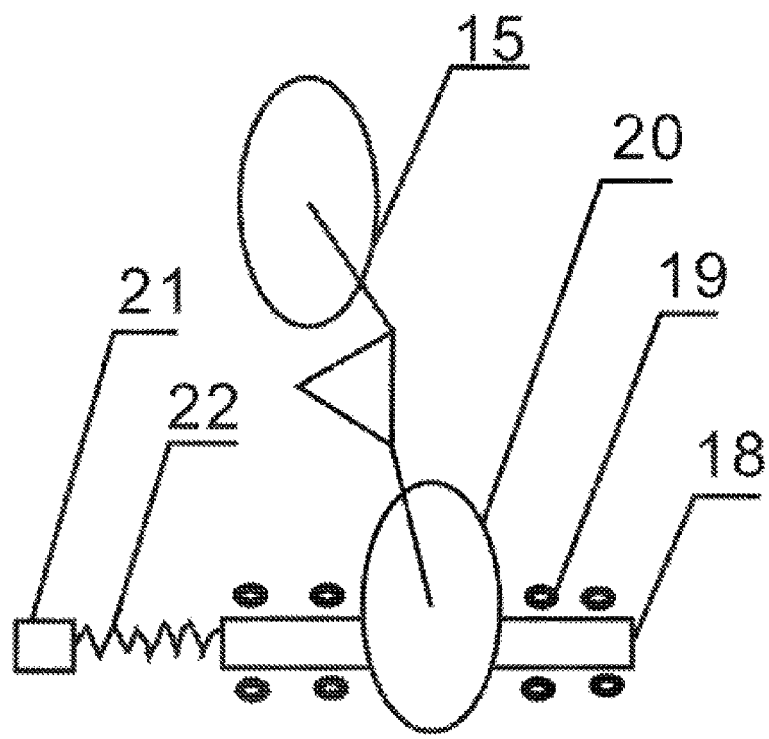
FIG. 3 is a schematic diagram of a rear-wheel correcting and fine-adjusting device according to the present invention, in which a handlebar is not corrected.
Figure 4:
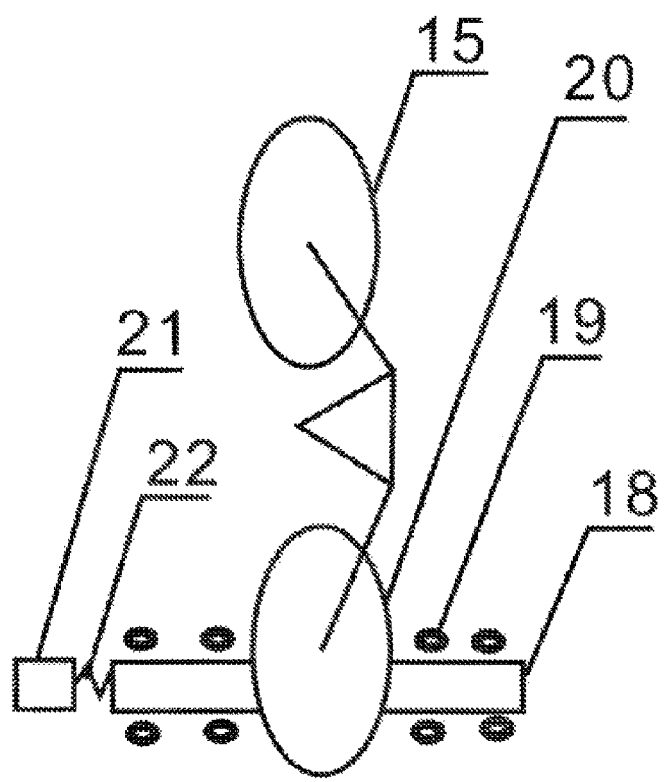
FIG. 4 is a schematic diagram of a rear-wheel correcting and fine-adjusting device according to the present invention, in which the handlebar is corrected.

As the user usually cannot completely correct the handlebar, the conveying device in the warehousing box 14 is started and automatically delivers the bicycle into the warehousing box 14. The bicycle which is just delivered in the warehousing box 14 is shown in FIG. 3. When the rear wheel 20 reaches the slider 18 on the rear-wheel correcting and fine-adjusting device 17 in the warehousing box 14, the controller in the warehousing box 14 communicates with the controller of the bicycle (through wire communication by the guide slot or wireless communication) to obtain the deviation angle of the front and rear wheels (as the front wheel enters the warehousing box through the guide slot, the position of the front wheel is accurate). Then, the fine-adjusting motor 21 is started and drives the slider 18 to move leftward or rightward to align the rear wheel 20 with the front wheel 3, as shown in FIG. 4. After the fine adjustment, the conveying device in the warehousing box 14 pulls the rear wheel 20 forward to separate with the slider 18, so that the correcting and fine-adjusting function can be achieved by this slider 18 for the entering of subsequent bicycles. The slider 18 can only move in the left-right direction, and during the left-right movement of the slider 18, the controller in the warehousing box 14 controls the conveying device in the warehousing box 14 to pull the front wheel 3 forward to avoid the forcible backward slip of the rear wheel 20. The conveying device in the warehousing box is actually a group of sliders driven by electric motors, and the conveying device drives the bicycle forward or backward through the lifting electromagnet when the bicycle enters the warehousing box.

The retracted blade-shaped bicycle 15 is orderly and compactly stored in the warehousing box 14. To stably align the front and rear wheels in the warehousing box 14 for convenient storage and discharge of the bicycle in the warehousing box 14, the meshing gear 5 is provided with a baffle 7, and the DC gear motor is used to drive the locating pin 10 to move. When the handlebar of the bicycle handle 1 is corrected (i.e., the front wheel aligns with the rear wheel), the locating electric motor 12 drives the locating pin 10 to lock the meshing gear 5 so that the front wheel stably aligns with the rear wheel for convenient storage and discharge of the bicycle in the warehousing box 14. In addition, the locating pin 10 is communicated with a magnetic core 11, and the bicycle frame is installed with the Hall effect sensor 13 to sense whether the locating pin 10 completely locks or releases the gear.

In some embodiments, a lifting device is added between the front wheel and the rear wheel to save the operation space for correcting the rear wheel. This device allows the rear wheel to be corrected in advance without reaching the rear-wheel fine-adjusting device, and the detailed description can be referred to Chinese Patent Application No. 201820658632.0, titled "Assistant device for automatically correcting a rear wheel of bicycle for warehousing the bicycle". To simplify the storage and discharge of the bicycle, the conveying device only needs to hold the front of the bicycle frame to let the bicycle go into or out of the warehousing box through "the rolling of the bicycle wheels".

INDUSTRIAL APPLICABILITY

All the components of the present disclosure are suitable to be manufactured in industrial mass production.

What is claimed is:

1. A system for automatically correcting a position of a handlebar of a bicycle and warehousing the bicycle, comprising:
   the bicycle, and
   a warehousing box for storing the bicycle;
   wherein the bicycle includes a bicycle frame, the handlebar, a stem, a front wheel and a rear wheel; an encoder is mounted on the bicycle frame for recording a rotation angle of the stem and sensing whether the handlebar is corrected in position such that the front wheel and the rear wheel are aligned; a fine-adjusting device is provided in the warehousing box or on the bicycle frame and is configured to automatically twist the rear wheel according to the rotation angle of the encoder on the bicycle frame to align the rear wheel with the front wheel.

2. The system of claim 1, wherein when a user warehouses the bicycle into a vacancy in the warehousing, the user first aligns the front wheel and a guide slot of the vacancy in the warehousing box, and pushes the bicycle into the warehousing box; the front wheel triggers a switch in the warehousing box to remind the user of correcting a position of the rear wheel; after the user lifts the rear wheel to align with the front wheel, a conveying device in the warehousing box is able to automatically determine whether the rear wheel and the front wheel are aligned and is able to deliver the bicycle into the warehousing box when the rear wheel and the front wheel are aligned; if the front wheel and the rear wheels are not aligned, the user will be reminded of correcting the position of the rear wheel again; and
   the conveying device consists of a plurality of first sliders driven by an electric motor; and the conveying device is configured to drive the bicycle forward or backward through a lifting electromagnet when the bicycle enters the warehousing box.

3. The system of claim 1, wherein the bicycle frame is further provided with a locating device; when the rear wheel and the front wheel are aligned, an electric actuator drives the locating device to lock the front wheel, so that the front wheel stably aligns with the rear wheel for convenient storage and discharge of the bicycle in the warehousing box.

4. The system of claim 2, wherein a second slider is provided in the fine-adjusting device; and
   during the fine adjustment of the rear wheel, the second slider is capable of moving in a left-right direction; and during the second slider's left-right movement, a controller of the warehousing box controls the conveying device in the warehousing box to drive the front wheel forward to avoid forcible backward slip of the rear wheel.

5. The system of claim 4, wherein after the rear wheel is finely adjusted, the conveying device in the warehousing box pulls the rear wheel forward to separate with the second slider.

6. The system of claim 3, wherein the bicycle frame is provided with a Hall effect sensor to sense whether a meshing gear is locked or released.

7. The system of claim 1, wherein the bicycle is pushed or pulled to go into or out of the warehousing box using the rolling of the front and rear wheels.

* * * * *